United States Patent
Parson et al.

(10) Patent No.: US 9,031,873 B2
(45) Date of Patent: May 12, 2015

(54) METHODS AND APPARATUS FOR ANALYSING AND/OR PRE-PROCESSING FINANCIAL ACCOUNTING DATA

(75) Inventors: Rupert Parson, London (GB); Andrew Shuttlewood, Sevenoaks (GB); Andrew Dunn, Reading (GB); Alan Hambrook, Bagnols en Forêt (FR)

(73) Assignee: Future Route Limited, London (GB)

( * ) Notice: Subject to any disclaimer, the term of this patent is extended or adjusted under 35 U.S.C. 154(b) by 863 days.

(21) Appl. No.: 12/527,170

(22) PCT Filed: Feb. 7, 2008

(86) PCT No.: PCT/GB2008/000445
§ 371 (c)(1),
(2), (4) Date: Apr. 29, 2010

(87) PCT Pub. No.: WO2008/099142
PCT Pub. Date: Aug. 21, 2008

(65) Prior Publication Data
US 2010/0205076 A1    Aug. 12, 2010

Related U.S. Application Data

(60) Provisional application No. 60/889,700, filed on Feb. 13, 2007.

(51) Int. Cl.
*G06Q 40/00* (2012.01)
*G06Q 40/02* (2012.01)

(52) U.S. Cl.
CPC ............ *G06Q 40/02* (2013.01); *G06Q 40/10* (2013.01); *G06Q 40/00* (2013.01); *G06Q 40/12* (2013.01)

(58) Field of Classification Search
CPC ........................................... G06Q 40/10
USPC .................................. 705/7, 30, 35
See application file for complete search history.

(56) References Cited

U.S. PATENT DOCUMENTS

| | | | |
|---|---|---|---|
| 5,913,214 A * | 6/1999 | Madnick et al. | 707/999.01 |
| 7,788,186 B1 * | 8/2010 | An et al. | 705/306 |
| 2003/0195836 A1 * | 10/2003 | Hayes et al. | 705/37 |
| 2005/0171881 A1 * | 8/2005 | Ghassemieh et al. | 705/35 |
| 2006/0031150 A1 * | 2/2006 | Senturk et al. | 705/35 |
| 2006/0059063 A1 * | 3/2006 | LaComb et al. | 705/35 |
| 2007/0027674 A1 * | 2/2007 | Parson et al. | 704/9 |
| 2007/0136115 A1 * | 6/2007 | Senturk Doganaksoy et al. | 705/7 |
| 2008/0027769 A1 * | 1/2008 | Eder | 705/7 |
| 2008/0172264 A1 * | 7/2008 | Hoefelmeyer | 705/7 |
| 2010/0223172 A1 * | 9/2010 | Donnelly et al. | 705/34 |

* cited by examiner

Primary Examiner — Hunter Wilder
(74) Attorney, Agent, or Firm — Conley Rose, P.C.

(57) ABSTRACT

In an on-line method of analyzing financial accounting data, uploaded financial accounting data is received at a server (2) from a client computer (3). The data is analyzed at the server (2) to identify anomalies in the data. A display is provided at the client computer (3) representing the anomalies that have been identified. Further, in a method of pre-processing financial accounting data prior to analyzis of the data, the financial accounting data is abstracted to correspond to a pre-stored accounting ontology. Further, in a method of analyzing financial accounting data, the method checks the data for violation of a particular state to identify inconsistent combinations of values in the data.

26 Claims, 7 Drawing Sheets

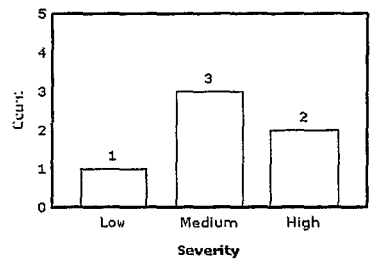

The graph above shows the interrogation rule failures that we have found in your accounts.

Fig 2A

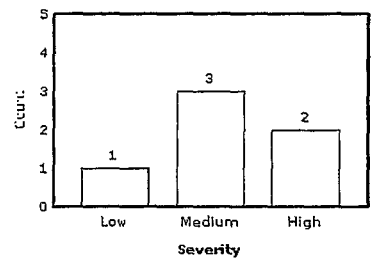

The graph above shows the interrogation rule failures that we have found in your accounts.

| Issue | Count | Value |
|---|---|---|
| Balance Sheet Depreciation Accounts should always be in credit | 1 | £12,864.00 |
| Unexpected transaction type in expense accounts | 2 | £3,538.90 |
| Fixed asset cost account should always be a debit balance | 29 | £11,591.86 |

Fig 2B

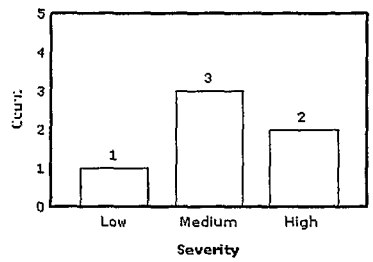

The graph above shows the interrogation rule failures that we have found in your accounts.

| Issue | Count | Value |
|---|---|---|
| Balance Sheet Depreciation Accounts should always be in credit | 1 | £12,864.00 |
| Unexpected transaction type in expense accounts | 2 | £3,538.90 |
| FY'05 | 3 | £2,081.27 |
| FY'04 | 3 | £1,457.63 |
| Fixed asset cost account should always be a debit balance | 29 | £11,591.86 |

Fig 2C

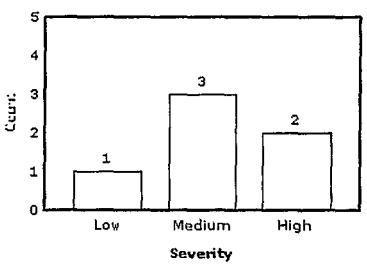

The graph above shows the interrogation rule failures that we have found in your accounts.

| Issue | | | | | | | | Count | Value |
|---|---|---|---|---|---|---|---|---|---|
| Balance Sheet Depreciation Accounts should always be in credit | | | | | | | | 1 | £12,864.00 |
| Unexpected transaction type in expense accounts | | | | | | | | 2 | £3,539.90 |
| FY'05 | | | | | | | | 3 | £2,081.27 |

| N/C | Name | Value | Debit | Credit | Account | Number | Date | Type | Details | REF |
|---|---|---|---|---|---|---|---|---|---|---|
| 6970 | Juned Gani Salary | 1064.63 | | 1064.63 | 1200 | 56044 | 06/01/2005 | BR | Recall Dec Salary | BACS |
| 7008 | STAFF PENSIONS | 140.0 | | 140.0 | 1200 | 58774 | 31/01/2005 | BR | Scotish Equ - S George | bgc |
| 7008 | STAFF PENSIONS | 253.0 | | 253.0 | 1200 | 60670 | 22/02/2005 | BR | Scottish Equ | chqSco |

| | | |
|---|---|---|
| FY'04 | 3 | £1,457.63 |
| Fixed asset cost account should always be a debit balance | 29 | £11,591.86 |

Fig 2D

| Age | Gender | Height | Marital status | Religion |
|---|---|---|---|---|
| 38 | Male | 133 | Husband | Protestant |
| 62 | Female | 145 | Single | Anglican |
| 42 | Male | 169 | Single | Catholic |
| 36 | Male | 135 | Single | Islam |
| 20 | Male | 184 | Husband | Islam |
| 32 | Female | 126 | Single | n/a |
| 76 | Female | 133 | Single | Atheist |
| 50 | Male | 158 | Husband | Catholic |
| 20 | Female | 117 | Husband | Protestant |
| 24 | Female | 134 | Single | Atheist |
| 50 | Female | 143 | Single | Catholic |
| 74 | Male | 186 | Single | Protestant |
| 59 | Male | 171 | Husband | Anglican |
| 22 | Female | 132 | Wife | Anglican |
| 60 | Female | 103 | Wife | Catholic |
| 42 | Male | 176 | Single | Islam |
| 34 | Male | 137 | Single | Atheist |
| 51 | Male | 152 | Single | Anglican |
| 58 | Male | 159 | Single | Islam |
| 36 | Female | 127 | Wife | Islam |
| 58 | Female | 129 | Wife | Protestant |
| 27 | Female | 102 | Single | Anglican |
| 42 | Male | 149 | Husband | Atheist |
| 68 | Female | 103 | Single | Atheist |
| 55 | Male | 164 | Husband | n/a |
| 45 | Female | 123 | Wife | n/a |
| 53 | Female | 117 | Single | Protestant |
| 63 | Male | 179 | Single | Anglican |
| 27 | Male | 181 | Single | Catholic |
| 57 | Female | 133 | Single | n/a |
| 62 | Male | 168 | Single | Anglican |

Fig 5

| Age | Gender | Height | Marital status | Religion |
|---|---|---|---|---|
| start | start | start | start | start |
| no item | no item | no item | no item | no item |
| 1 | Female | 102 | Husband ← | Anglican |
| 22 | Male ← | 103 | Single | Atheist |
| 24 | | 117 | Wife | Catholic |
| 27 | | 123 | | Islam ← |
| 32 | | 126 | | n/a |
| 34 ← | | 127 | | Protestant |
| 36 | | 129 ← | | |
| 38 | | 132 | | |
| 42 | | 133 | | |
| 45 | | 134 | | |
| 50 | | 135 | | |
| 51 | | 137 | | |
| 53 | | 143 | | |
| 55 | | 145 | | |
| 57 | | 149 | | |
| 58 | | 152 | | |
| 59 | | 158 | | |
| 60 | | 159 | | |
| 62 | | 164 | | |
| 63 | | 168 | | |
| 68 | | 169 | | |
| 74 | | 171 | | |
| 76 | | 176 | | |
| | | 179 | | |
| | | 181 | | |
| | | 184 | | |
| | | 186 | | |

Fig 6

METHODS AND APPARATUS FOR ANALYSING AND/OR PRE-PROCESSING FINANCIAL ACCOUNTING DATA

CROSS-REFERENCE TO RELATED APPLICATIONS

The present application claims the benefit of priority to PCT/GB2008/000445 filed 7 Feb. 2008, which is hereby incorporated herein by reference in its entirety for all purposes, and claims the benefit of priority to U.S. Provisional Application No. 60/889,700 filed 13 Feb. 2007, which is also incorporated herein by reference in its entirety for all purposes.

STATEMENT REGARDING FEDERALLY SPONSORED RESEARCH OR DEVELOPMENT

Not applicable.

CROSS-REFERENCE TO RELATED APPLICATIONS

This application claims the benefit of priority to U.S. application Ser. No. 60/889,700, filed Feb. 13, 2007, the entire content of which is hereby incorporated by reference.

This patent application is related to International Patent Application No. PCT/GB2008/00045, filed Feb. 7, 2008, the entire content of which is hereby incorporated by reference.

In this specification, various headings and sub-headings have been used. It should be noted that the headings and sub-headings have been used merely for reasons of clarity and convenience and are not intended to have any legal effect.

FIELD OF THE INVENTION

The present invention relates to methods, computer apparatus and computer programs for analysing financial accounting data and/or pre-processing financial accounting data.

BACKGROUND OF THE INVENTION

In today's increasingly litigious business environment, the necessity for more stringent financial and accounting data analysis and control is ever growing. At present, this is partially addressed by the role of auditors through their examination of the financial statements and underlying records to determine if the statements represent a true and fair view of the company's activities and are free from material misstatement Auditors currently apply the technique of sampling in their approach and performance of an audit on the understanding that coverage of 100% of the transactions is costly, time-consuming and infeasible. Instead, if errors are found during the testing phase, these are extrapolated across the entire population to gain understanding as to the extent to which the error potentially affects the data.

The nature and extent of an audit is decided once a thorough "audit risk" assessment has been carried out. "Audit risk" is the risk that the auditor may provide an inappropriate opinion on the financial statements. In general terms, this consists of three components:

$$\text{audit risk} = \text{inherent risk} \times \text{control risk} \times \text{detection risk}$$

Ideally, all transactions and other data in an accounting system would be assessed as part of an audit procedure in order to reduce the detection risk. Ideally, a comprehensive summary of errors or anomalies would be provided to enable the control risk to be reduced. With present sampling methods, which are essentially manual, this is not feasible.

SUMMARY OF THE PRESENT INVENTION

According a first aspect of the present invention, there is provided an on-line method of analysing financial accounting data, the method comprising:

receiving at a server uploaded financial accounting data from a client computer;

analysing the data at the server to identify anomalies in the data; and, providing at the client computer a display representing the anomalies that have been identified.

The preferred embodiments of the present invention provide an online method and apparatus for the identification of anomalies in financial accounting data. Such anomalies may include violation of a particular state or wild variations from a single (expected or "normal") value or may give rise to inconsistent combinations of values in the data that are detected in the preferred embodiment. The preferred embodiment will, in a matter of seconds, carry out an interrogation of all transactions present (systematically increasing the relevance, occurrence, completeness and sufficiency of evidence), quantify the value of each interrogation or deviation failure and present the results in a complete manner, clearly, readable and exportable for inclusion in an auditor's working papers. As such, the time taken to perform the numeric investigation of the financial statements and the subsequent cost is considerably reduced.

The method preferably comprises, prior to the analysing, abstracting the uploaded data to correspond to an accounting ontology that is stored at the server. The preferred accounting ontology is an abstract internal representation of financial accounting concepts upon which at least some of this embodiment's rules and analysis can be based. This means that the method is easily adapted to work on a wide range of accounting products.

The method preferably comprises obtaining a map of the abstracted data to the accounting ontology. In an embodiment, the abstracted data and the accounting ontology are represented by tree structures having nodes and branches, the map being obtained by recursively determining the overlap of nodes in the abstracted data with nodes in the accounting ontology. The overlap may be measured within a predefined tolerance.

The method preferably comprises editing the obtained map to amend the correspondence between the uploaded data and the accounting ontology. This further makes the method easily adaptable to work on a wide range of accounting products.

Preferably, the analysing is carried out on the entirety of the uploaded data. This provides the most complete analysis of the data and is not practical in the prior art, manual methods which therefore rely on sampling of the data.

In an embodiment, the analysing comprises identifying contra and reversal transactions in the data. In an embodiment, these transactions are removed from further analysis as they have effectively been "corrected" by the user of the accounting system.

In an embodiment, (at least some of) the analysing is carried out via rules that are applied to the data. In an embodiment, the rules may be edited by a user. This further makes the method easily adaptable to work on a wide range of accounting products.

At least some of the rules preferably check the data for violation of a particular state. At least some of the rules preferably check the data for variation beyond a threshold compared to a corresponding variation of the data at a previous time instance.

In an embodiment, the method comprises determining a distribution of at least some of the data over a period of time, wherein the analysing comprises identifying data that exists beyond a threshold outside said distribution.

In an embodiment, the analysing comprises identifying inconsistent combinations of values in the data.

In an embodiment, the analysing comprises identifying duplicate transactions in the data. In an embodiment, these transactions are drawn from Sales and Purchase invoices.

In an embodiment, the display that is provided at the client computer provides an indication of the number of anomalies that have been identified and the ability to display details of the individual transactions in the analysed data that have contributed to said anomalies. In this way, the user is provided with an effective way of identifying, locating and investigating which individual transactions in the analysed data have contributed to said anomalies. In a preferred embodiment, the user can "click" on items in the display so that the user can "drill down" from for example a high level issue description all the way down to the individual transactions that have been identified as contributing to that issue. Bearing in mind that in the preferred embodiment, all transactions are analysed, this provides the user with a powerful but straightforward arrangement to identify and investigate the individual transactions that have been identified as contributing to that issue.

According to a second aspect of the present invention, there is provided apparatus for on-line analysis of financial accounting data, the apparatus comprising:
a server constructed and arranged to receive uploaded financial accounting data from a client computer;
the server having a data analysis engine constructed and arranged to analyse the data at the server to identify anomalies in the data;
the server being constructed and arranged to cause a display at the client computer a representation of the anomalies that have been identified.

According to a third aspect of the present invention, there is provided a method of pre-processing financial accounting data prior to analysis of the data, the method comprising:
abstracting the financial accounting data to correspond to a pre-stored accounting ontology.

The preferred accounting ontology is an abstract internal representation of financial accounting concepts. This aspect arranges the user data into a "standard" format and can therefore work on a wide range of accounting products.

The method preferably comprises obtaining a map of the abstracted data to the accounting ontology. The abstracted data and the accounting ontology may be represented by tree structures having nodes and branches, the map being obtained by recursively determining the overlap of nodes in the abstracted data with nodes in the accounting ontology. The overlap may be measured within a predefined tolerance.

The method preferably comprises editing the obtained map to amend the correspondence between the uploaded data and the accounting ontology.

The abstracted data may be analysed.

According to a fourth aspect of the present invention, there is provided apparatus for pre-processing financial accounting data prior to analysis of the data, the apparatus comprising:
an abstraction engine constructed and arranged to abstract the financial accounting data to correspond to a pre-stored accounting ontology.

According to a fifth aspect of the present invention, there is provided a method of analysing financial accounting data, the method comprising:
applying rules to the data to check the data for violation of a particular state;
applying rules to the data to check the data for variation beyond a threshold compared to a corresponding variation of the data at a previous time instance;
determining a distribution of at least some of the data over a period of time, wherein the analysing comprises identifying data that exists beyond a threshold outside said distribution; and,
identifying inconsistent combinations of values in the data.

The preferred data analysis operates on the entirety of the data and provides a complete analysis of the data by carrying out an interrogation of all transactions present (systematically increasing the relevance, occurrence, completeness and sufficiency of evidence), and quantifying the value of each interrogation or deviation failure, and can permit the results to be presented in a complete manner, clearly, readable and exportable for inclusion in an auditor's working papers. The anomalies that are looked for by the preferred embodiment include violation of a particular state and wild variations from a single (expected or "normal") value and those that give rise to inconsistent combinations of values in the data.

The method may comprise, prior to the analysing, identifying contra and reversal transactions in the data and withdrawing such transactions from the data that is subject to the analysing and subsequent steps.

The method may comprise identifying duplicate transactions in the data. Such duplicate transactions may be within Sales and Purchase invoices.

The rules may be edited by a user.

The method preferably comprises, prior to the analysing, abstracting the data to correspond to an accounting ontology.

According to a sixth aspect of the present invention, there is provided apparatus for analysing financial accounting data, the apparatus comprising:
a data analysis engine constructed and arranged to apply rules to the data to check the data for violation of a particular state;
the data analysis engine being constructed and arranged to apply rules to the data to check the data for variation beyond a threshold compared to a corresponding variation of the data at a previous time instance;
the data analysis engine being constructed and arranged to determine a distribution of at least some of the data over a period of time and to identify data that exists beyond a threshold outside said distribution; and,
the data analysis engine being constructed and arranged to identify inconsistent combinations of values in the data.

In an embodiment, the data analysis engine is constructed and arranged to identify contra and reversal transactions in the data prior to applying the rules to the data, such transactions being withdrawn from the data that is subject to the application of the rules and subsequent analysis.

In an embodiment, the data analysis engine is constructed and arranged to identify duplicate transactions in the data. Such duplicate transactions may be within Sales and Purchase invoices.

In one preferred embodiment, a web server provides online access for a user to upload data and view the results of analysis; an internal system for the interrogation, inspection, and analysis of financial accounting data; interfaces to present the results of the analysis back to the user; and methods to enable the user to resolve, comment on, and track the status of any issues identified.

The use of the preferred embodiment as an internal and accounting control system reduces the control risk existing in a set of accounting records by increasing the likelihood of detection and ability for correction of material misstatements by providing a comprehensive and detailed summary of errors and anomalies and tracking of resolutions on an on-demand basis. By examining 100% of the data, the preferred embodiment eliminates entirely the sampling component of the detection risk. Thus the detection risk that an auditor's substantive procedures do not uncover any material misstatements is reduced. Furthermore, the preferred embodiment reduces the detection risk of the audit by the use of analysis designed to detect and highlight the potential manipulation of data, non-routine transactions, human error and override.

The efficiency of an audit is also greatly improved by the preferred embodiment's in-built ability to assign, reassign and delegate areas for attention between colleagues and subordinates depending on experience of the individual and importance of audit areas.

The importance of audit areas may be assessed by the preferred embodiment through the automatic calculation of materiality that can be applied and adjusted as appropriate depending on the subsequently reduced risk remaining in the financial data, as perceived by the auditors, leading to greater assurance and improved credibility of the financial statements.

BRIEF DESCRIPTION OF THE DRAWINGS

Embodiments of the present invention will now be described by way of example with reference to the accompanying drawings, in which:

FIG. 2 shows schematically an example of a display that may be provided at a user's computer;

FIG. 5 shows an example of an unusual combination in data identified by the method of FIG. 3; and, FIG. 6 shows schematically the use of pointers in a search of FIG. 3.

DETAILED DESCRIPTION OF THE PREFERRED EMBODIMENTS

Figure 1:
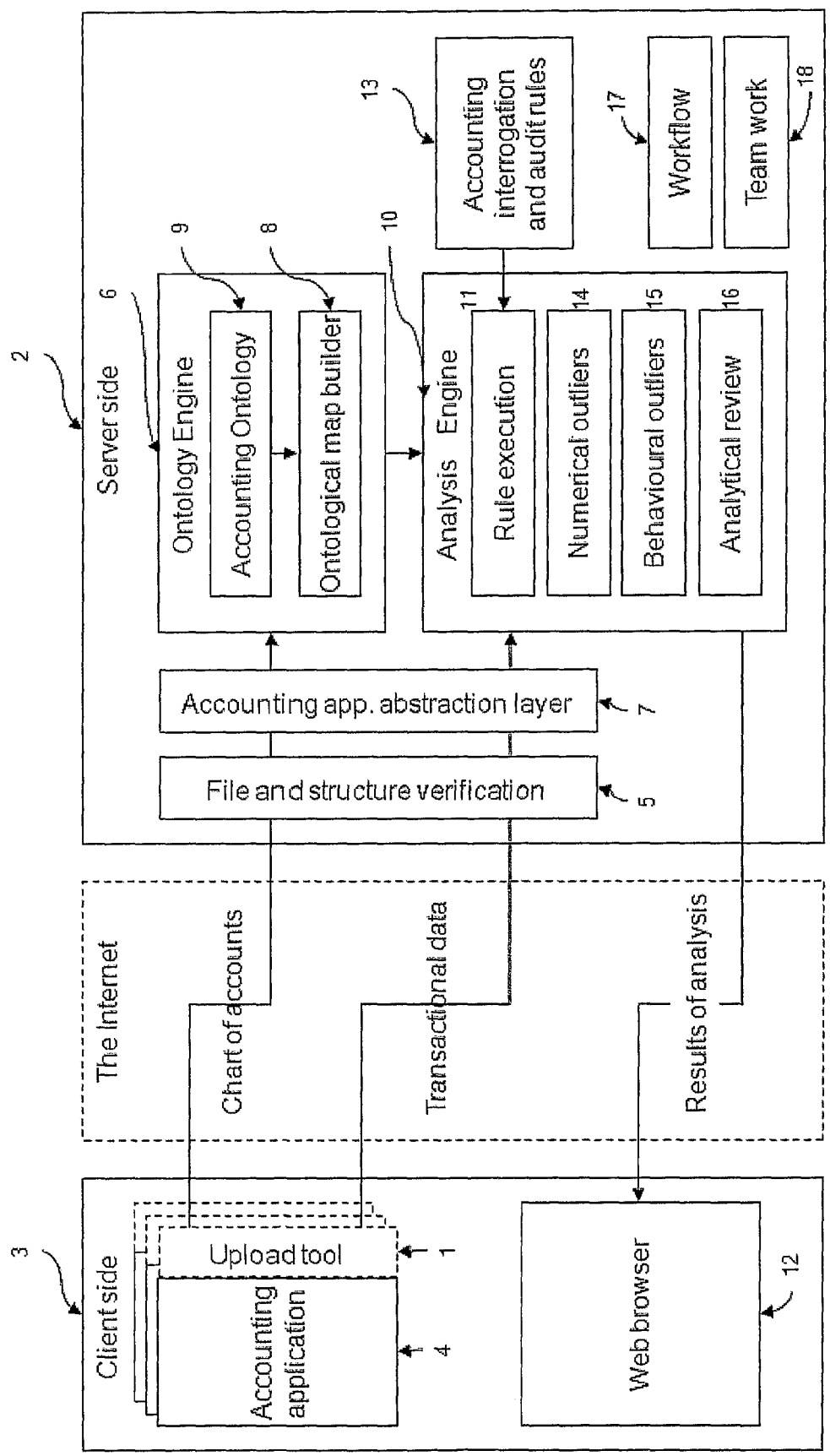
FIG. 1 shows schematically an example of the interaction between a client and a server across the Internet in accordance with an embodiment of the present invention.

The basic functionality of the preferred embodiment can be summarised as follows. In no particular order, the preferred embodiment:

provides users of a variety of different accounting applications with an interface to upload accounting data for analysis;

automatically derives a map from a generic accounting ontology into the user's accounting data (an "ontology" here being an explicit formal specification of how to represent the objects and other entities that are assumed to exist in the accounting data and the relationships that hold among them);

uses the accounting ontology to analyse the accounting data for potential "issues" of rule violation, trend deviation, abnormal transaction values, unusual transactional behaviour, deviation from expected distributions, and duplicate transactions;

identifies contra and reversal transactions in the data, which can then be withdrawn from the analysis;

provides an interface via which the user can modify the rules used to validate the data;

processes the accounting data to provide useful accounting analysis in the form of an analytical review;

presents the results to the user through a Web-based interface;

allows the user to resolve, and comment on issues found by the analysis;

allows the user to share analysis with other users;

allows the user to work collaboratively as a member of a team, with individual team members assigned areas of responsibility;

allows the user to search through the transactions using text fields and complex rules; and, allows the user to download an electronic form of the results of the analysis to their client computer;

The following sections describe each of these areas in detail.

Data Upload

The preferred embodiment provides an interface 1 through which data can be uploaded to a back end server 2 from the user's client 3.

Manual Uploads

In its simplest embodiment, the system provides an interface 1 through which customers can manually upload the files required to the back end server 2 for analysis. These files are manually exported from the underlying accounting application 4.

File Verification

Software running on the server 2 provides a file and structure verification module 5 that checks that the file that the user has uploaded is in the correct format before attempting to proceed with any analysis. Further to this, the file and structure verification module 5 checks that the file that the user has uploaded is different from a previously uploaded file, and will warn the user if nothing at all has changed. In this case, analysis will only proceed if the user insists.

Automated Uploads

In a preferred embodiment, the system provides a tool for each target accounting application, which is downloaded to the client 3 and which automates the process of extracting, compressing, encrypting, and uploading the data from the client 3 to the server 2.

Accounting Ontology and the Chart of Accounts

In general, accounting software programs maintain a structured set of accounts through which transactions are processed. Each account is related to a specific accounting notion and lies in a distinct position on the profit and loss or balance sheet statements (the financial statements). These distinct accounts are commonly enumerated in a tabulated presentation known as the "Chart of Accounts". The Chart of Accounts presents all of the accounts used by the system and orders them into a logical sequence reflecting the financial statements and the accounts' positions within them. Accounting software programs allow their users to heavily customise the Chart of Accounts to reflect their own business processes and structure.

In order for the server 2 to be able to analyse the accounts contained within the Chart of Accounts in the appropriate manner, it must be able to correctly categorise the accounts into the areas of the financial statements in which they properly lie.

An important aspect that contributes to the portability of the preferred embodiments of the present invention to different accounting software programs is the underlying model of the financial statements, referred to herein as the "Accounting Ontology". This abstract representation of generic accounting concepts allows the preferred embodiments to create rules, ratios, and other underlying elements in a non-package-specific format, maintaining portability and the ease of development of the system for other accounting packages.

An automated analysis and mapping process is used to map the Accounting Ontology onto the Chart of Accounts of the data file being uploaded.

Accounting Ontology

The Accounting Ontology provides a framework hierarchy of accounting categories. This hierarchy is retained as an internal representation in the form of a tree structure. A predefined hierarchical framework of accounting statement categories is defined internally, in a form that is independent of any target accounting application. Predefined ontologies can be read from storage, such as from disk.

An ontology module or engine 6 operates to create the ontology structure, which, formally, is created from a set of nodes arranged in a tree structure. Each node is associated with an accounting category, and has a number of child nodes.

For example the following basic structure could be used by the ontology module 6 as a default Accounting Ontology:

```
Balance Sheet
    Net Assets
        Fixed Assets
        Net Current Assets
            Current Assets
            Current Liabilities
        Long-Term Liabilities
    Capital And Reserves
Profit And Loss
    Operating Profit
        Gross Profit
            Sales
            Cost Of Sales
        Operating Expenses
    Bank Charges And Interest
```

Typically, however, a default Accounting Ontology with a much greater level of detail than this is used.

Ontology to Chart of Accounts Map

Accounting packages keep transactional records grouped into logical nominal accounts. Each account caters for a different area of the business and accounting principle. Accounting packages label these accounts with a tag, often a number, and with a name, and lays them out into a logical hierarchical structure called the "Chart of Accounts".

An accounting application abstraction layer 7 reads in the user's Chart of Accounts from the uploaded data into a tree structure very similar to the Accounting Ontology structure, but with the additional feature that each node in the Chart of Accounts hierarchy includes a number of accounts from the user's accounting package.

A map builder module 8 in the ontology engine 6 assigns each of these accounts in the Chart of Accounts to nodes in the Accounting Ontology 9. Each node in the Accounting Ontology 9 could be mapped to one or more of the nominal accounts within the Chart of Accounts.

The greatest accuracy is achieved when the Accounting Ontology 9 has been correctly mapped to the Chart of Accounts. In order to automate as much as possible the process of setting up this map, the system provides the ability to upload the Chart of Accounts exported from the underlying target accounting package. The map is then automatically created from the file containing the Chart of Accounts.

One preferred method for creating the map to the user's Chart of Accounts from the default ontology proceeds with the following recursively defined method. The function uses a user-defined tolerance parameter, P, typically set at 90%. The method is initiated by calling a function labelled herein Match(root node of chart of accounts, root node of default Ontology) as follows:

Match(User chart of accounts node A, Accounting Ontology node B)
1. Let C be the current overlap of the accounts in A with B
2. Find the descendant D of B that has overlap with the accounts in A that is greater than P % of C.
3. If there is no such descendant of B then:
   a. map the overlapped accounts of A to B,
   b. if there are no accounts left unmapped in A then exit the function,
   c. otherwise, let E="the accounts left unmapped in X", and recursively call Match(E,B).
Otherwise, for each of the children F of X, recursively call Match(F,D).

Upon completion of this method, all of the accounts in the Chart of accounts will have been mapped to entries in the default ontology.

Chart of Accounts Editor

The preferred embodiment of the ontology module 6 provides an interface through which the user can edit the map from Accounting Ontology 9 to the Chart of Accounts. The editor presents the default ontology to the user, with each node indicating to which accounts in the underlying accounting package it has been mapped. If the user wishes to modify any element of the map, for example by moving an account to a different node in the ontology, the user can select the account (e.g. by clicking on a graphical representation), drag it to another node in the ontology, and release it. That account will then be remapped to the new node indicated by the user.

If the user modifies the Chart of Accounts, the ontology engine 6 prompts the user to suggest that the analysis should be re-run to take into account the new map. The user is able to choose whether to upload new accounting data, or to re-run on the most recently uploaded data.

Validation and Analysis Engine

A validation and analysis engine 10 is provided, the core validation element of which inspects entries in the data for a wide range of potential data problems. A number of different mechanisms are used by the system to identify groups of transactions, and the individual entries within them, which:
 do not comply with interrogation rules;
 are collectively unusually high or low when compared to a trend in the data;
 are individually unusually high or low when compared to typical values;
 do not follow the standard behaviour exhibited by the data;
 are a duplicate of another transaction;
 are not compliant with Benford's law (see below); or
 have potentially been manipulated from one upload to the next.

Any instance of one of these mechanisms being triggered is known as a validation failure and can be regarded as the identification of an anomaly in the data. As referred to herein, an "issue" is an instance of a validation failure on the data. There may be many, one, or even a complete absence of transactions that are associated with an issue. More detail on each of the validation mechanisms of the preferred embodiment is given below.

A variant of the validation and data analysis engine includes an element to identify contra or reversal transactions, which can then be withdrawn from further analysis.

Identification of Contra and Reversal Transactions

A contra or a reversal transaction is an accounting entry that offsets a previous entry, usually with the intention of correcting that entry.

In most cases, the original transaction and the offsetting entry are for identical amounts, and will be in the "opposite direction"—credit against debit and vice versa. The reversing transaction effectively cancels the original transaction because the net effect of the two transactions together is zero. It is therefore preferable in most circumstances to exclude both such transactions from the data analysis.

A preferred embodiment of the core validation element identifies the contra and reversal transactions in the data before subjecting the data to further analysis, and excludes such transactions from that further analysis.

The following is one method for identifying contra and reversal transactions:

Step 1: Sort the Data

The accounting entries should be sorted into an order for which pairs of entries consisting of a transaction and its reversal appear close to each other.

A preferred method is to sort first by Account Nominal Code, then by Transaction Amount, and finally by Date. This will place transactions in the same account close together; within those, transactions with similar amounts will be even closer; and finally, transactions that are close together in time will appear closer still.

Step 2: Conduct a Windowed Pass Over the Data

The second step is to perform a pass over the data that checks pairs of transactions to determine if one is a reversal of the other.

Each transaction is checked against a "window neighbourhood" of other transactions that lie near it in the new sorted order. The sorting the data in step 1 makes this a viable strategy. This method is greatly more efficient than simply checking each transaction against every other transaction in the data set. A preferred method of controlling the size of the window neighbourhood is to ensure that all the transactions within a window fall within a pre-defined time period of each other.

Step 3: Identify Contra/Reversal Pairs

In order to determine if a pair of transactions forms a transaction/reversal pair, the method checks that:
- the transactions are from the same account,
- they are for the same amount, and
- one transaction is in the opposite direction (credit vs debit) of the other.

If all of these criteria are satisfied then the pair is marked up as a transaction/reversal pair.

Rules

Two of the components of the core validation element of the present validation and analysis engine 10 depend on rules that are executed by a rule execution module 11 in order to perform validation checks against the uploaded transactional data. In a manual audit process, the data is sampled to produce a small representative sample which is then checked for problems. As will be obvious, this sampling process carries the risk of missing issues in the data, but is necessary in a manual process as it is impractical for every transaction to be checked manually. On the other hand, the preferred embodiment described herein checks every single transaction in the data set for problems, or, alternatively in another embodiment, the entire data set once contra and reversal transactions have been removed.

Rule Format

The user is able to define, add, and edit rules that are used by the analysis engine 10. Each rule is given a set of properties which includes, but is not limited to, the following:

Rule Description Text
This is a short piece of text that describes the problem that the rule identifies.

Rule Type
The rule may be an interrogation rule or a deviation rule.

Rule Severity Level
This may be for example "low", "medium" or "high".

Rule Periodicity
This defines how often the rule runs, and over what time period the values in the rule are computed.
These can be, but are not limited to: per transaction, monthly, quarterly, and annually.

Rule Enabled Status
This property indicates whether the rule is enabled or disabled.

Rule Definition
This property gives the full definition of the rule.
This is expressed in the form of a machine-executable code, much like a database SQL query, which can be run against the full data set to identify issues in the data.

The rules are defined generically in terms of nodes in the Accounting Ontology 9. The rules are therefore independent of the underlying accounting package from which the accounting data has been extracted. This separation of rules from the target application means that the system can be easily adapted to work with a multitude of different accounting systems, without needing to change the underlying rules to fit them.

The rules in one embodiment are defined using the following grammar:

```
Rule :=
    AccountingRule OR
    DeviationRule
AccountingRule :=
    <PreconditionList, ForEachTerm, Criteria, RulePeriodicity>
DeviationRule :=
    <NumericalTerm, RulePeriod, DeviationType, Threshold>
DeviationType :=
    one of { deviates from trend, deviates from average }
RulePeriod :=
    one of { transactional, monthly, quarterly, annually }
PreconditionList :=
    [ ] OR
    Criteria (and PreconditionList)
Criteria :=
    AggregationCriteria OR
    TransactionValue OR
    FieldSelection
AggregationCriteria :=
    NumericalTerm Comparator NumericalTerm
TransactionValue :=
    Value<SearchCriteriaList> Comparator NumericalTerm
ForEachTerm :=
    OntologicalElementList OR
    OntologicalType
FieldSelection :=
    SearchCriteriaList
Comparator :=
    one of { <, >, ==, =<, >=, != }
SetPredicate :=
    one of { is_one_of, is_not_one_of }
```

-continued

```
NumericalTerm :=
    Number OR
    NumericalTerm NumericalOperator NumericalTerm OR
    Sum<SearchCriteriaList> OR
    Count<SearchCriteriaList> OR
    Average<SearchCriteriaList> OR
    Balance<SearchCriteriaList> OR
NumericalOperator :=
    one of { + , - , * , / }
SearchCriteriaList :=
    TransactionType and ([ ] OR SearchCriteria (and
    SearchCriteriaList))
TransactionType :=
    one of { net, credit, debit }
SearchCriteria :=
    OntologicalElementList SetPredicate OR
    FieldName SetPredicate ValueList
OntologicalElementList :=
    OntologicalElement (and OntologicalElementList)
    For example, a rule might be defined to check that the
    Short Term Creditors item is being updated properly in the
    following manner:
    sum<Credits in Short Term Creditors> !=
    (sum<Debits in [Purchase Charges,Overheads,Direct
    Expenses]> – sum<Debits in [Bank Charges and Interest,Gross
    Wages,Depreciation]>).
```

This rule checks whether the sum of credit transactions in the Balance Sheet accounts mapped to Short Term Creditors is the same as the sum of the debit transactions in the Profit & Loss accounts mapped to the Purchase Charges, Overheads, and Direct Expenses, less the sum of the debit transactions in the Profit & Loss accounts mapped to Bank Charges and Interest, Gross Wages, and Depreciation. If the values are different, the rule fires and alerts the user of a potential accounting issue. In essence, the rule is checking an aspect of double-entry bookkeeping.

Rule Editor

The rule editor is presented as a GUI by the server side web server 2 to the user's browser 12. The interface allows the user to define and edit any rule, and change any of the rule's properties as described above in the rule format subsection.

Rule Packs

Rules grouped into predefined collections are provided by a rule module 13. Each collection groups rules that are defined along a particular common theme. This may be for example by industry sector, country locale, accounting regulations or accounting concept. The user is able to choose which rule packs are to be used.

Rule Types, and the Display of Rule Validation Results

In the following section there are described two types of rule that can be created within the system: accounting rules and deviation rules.

Accounting Rules

Accounting rules check transactions or groups of transactions for the violation of a particular state. This could be checking an aggregated value against a fixed or computed value, checking transaction types, tax codes, etc, and any combination of these checks. The structure of the rules is designed to allow the construction of rules to check for many different issues, including breaches of accounting conventions, for tax compliance, for data miss-entry, and for non-tallying values.

Any transaction, or group of transactions for which the assertion of an accounting rule does not hold true is flagged as an accounting rule failure issue.

Deviation Rules

Deviation rules check for wild variations in a single or aggregated value. In one embodiment, the value computed by the deviation rule is checked in one of two ways:

Absolute Outlier

If any individual period's value computed by a numerical outlier module 14 is an outlier when compared to the same value computed at all other time periods, then all the transactions contributing to its value are flagged as trend deviation issues. The amount that the value has to be beyond its normal value in order to be regarded as an "outlier" may be predefined and/or user-determined, and may be expressed as a percentage of its normal value (e.g. ±5%, ±10%, etc.).

Comparison to the Previous Transaction

A behavioural outlier module 15 computes the "delta" (i.e. the degree of change) from one time period to the next of the value being checked. If any individual change in value is an outlier when compared to the changes at all other time periods, then all the transactions in the second period contributing to its value are flagged as trend deviation issues. Again, the amount that the value has to be beyond its normal value in order to be regarded as an "outlier" may be predefined and/or user-determined, and may be expressed as a percentage of its normal value (e.g. ±5%, ±10%, etc.).

Display of Rule Results

In the preferred embodiment, an analytical review module 16 causes the results to be displayed in the user's browser 12 on a graph as a count of the number of issues that have been found at each severity level. These results are displayed through the web-page user interface. The interface allows the user to "drill down" from the high level issue description all the way down to the individual transactions that have been identified as contributing to that issue. Bearing in mind that in the preferred embodiment, all transactions are analysed, this provides the user with a powerful but straightforward arrangement to identify and investigate the individual transactions that have been identified as contributing to that issue.

As shown in FIG. 2A, in the preferred embodiment, the issues are initially shown as a bar graph, with issues being grouped by severity level. Referring to FIG. 2B, clicking on a severity level in the graph displays a summary of the issues that have been found at that severity level. Each line uses the short description property of the rule that has failed. Each issue is displayed with values indicating the count and total value of the transactions that contribute to it. Referring to FIG. 2C, clicking on an issue displays the periods for which that issue has been found. Referring to FIG. 2D, clicking on an issue period displays the individual transactions that have been identified as contributing to that issue in that period. Other ways or arranging for the user to "drill down" through the display to the underlying problematic transaction(s) are of course possible.

Abnormal Individual Transaction Values

For a particular account, in general the credits and the debits in that account will over time start to exhibit a distribution or pattern of behaviour. The analysis engine 10 tags any individual transactions that are outliers from this pattern as abnormal transactions. What constitutes an outlier may be expressed as a percentage variation from the norm (e.g. ±5%, ±10%, etc.).

The total number and sum of the abnormal individual transaction value issues found by the analytical review module 16 are displayed in the user's web browser 12 on a summary graph and in a table. The issues are shown grouped into account and credit or debit classification.

Unusual Transactional Behaviour

The preferred analytical review module 16 operates to analyse the transactions in the data file uploaded by the user in order to identify inconsistent combinations of values in those transactions. A preferred method and apparatus for this purpose is the subject of copending international patent application no. (AGENT'S REF. AF/P11040WO), the entire content of which is hereby incorporated by reference.

As set out in the following numbered sections, first a non-limiting description of several terms used herein will first be given to aid the understanding of that method and apparatus. The descriptions given here also relate each of the terms to a running example throughout: a data set generated from a census questionnaire from a sample of the population.

1.1 Column

A column in a data set is a vertical array of values, all of which are of the same type and described by the same heading. The size of a column, which is the number of entries in the vertical array, is equal to the number of records in the data set. In the census data set example, a column might be the answers to a particular question, such as ethnicity, given by all of the respondents. There will be as many entries in the column as there were respondents, and therefore records (completed census forms).

1.2 Row

A row in a data set is a horizontal array comprising one value from each column in the data set. The size of a row, which is the number of entries in the horizontal array, is equal to the number of columns in the data set. A row may sometimes be referred to as a record. A row in the census data set example would correspond to all of the entries on a completed census form for one individual respondent.

It will be understood that, given that in general the data will in practice be stored in computer memory or other storage devices, "column" and "row", and correspondingly "vertical" and "horizontal", are used herein largely metaphorically and by analogy, as is conventional in the art, and shall be construed accordingly.

1.3 Value

A value is the data element contained in a specific column of a row, or equivalently, a specific row of a column. In the census data set, this might correspond to a value entered into a box by a respondent, such as their age. A value can be one of two kinds:

Discrete Values: a discrete value is chosen from a specified set of possibilities. Two discrete values cannot be compared for anything other than equality. In the census data set, ethnicity is a discrete value.

Continuous Values: a continuous value is a numerical value to which standard arithmetic can be applied. Two continuous values can be compared with the usual mathematical comparison operators, such as "greater than", "less than", "equal to". In the census data set, the respondent's weight or height would be a continuous value.

The set of unique values found in a column is called a column value set.

1.4 Column Cardinality

The cardinality of a column is the number of unique or distinct values that occur in it, or equivalently, the size of its column value set. For instance, a column containing only two different distinct values (such as "Yes" and "No") has a cardinality of two.

"High cardinality" columns are columns with many distinct values. Each value in a high cardinality column is less frequent on average than values in a low cardinality column.

"Low cardinality" columns are columns with few distinct values. Each value in a low cardinality column is more frequent on average than values in a high cardinality column.

1.5 Itemsets

A specific value in a specific column is also known as a column value, or more simply, an item. An item is therefore a pair consisting of a column, coupled with a value found in that column. A row can therefore be considered as an array of items.

An itemset is a set of items, each for a distinct column. It is therefore a generalised row in which only a subset of the column values are specified. The other column values are unspecified, and can match any value in the dataset. An itemset's column set is the set of columns for which the items specify values. Note that a single item is effectively an itemset consisting of only one specified column value. If X is an itemset, then the individual items within X are denoted $x_1$, $x_2$, $x_3$ . . . .

"Itemset coverage" is the number of rows in the data set that match (are covered by) the itemset pattern, i.e. have the same item values in the subset of columns that are specified in the itemset. This is denoted cov(X).

A "frequent itemset" is an itemset that has a high coverage in a data set. In other words, it represents a pattern occurring frequently in the rows of data.

A "relatively infrequent itemset" is an itemset for which the individual items in the itemset each occur frequently in the dataset, but rarely do they occur all together on the same row. The existence of an infrequent itemset usually indicates a quality problem in the data.

1.6 Mathematics

The Shannon information of an event that occurs with probability x is defined to be $-\log_2(x)$. This function returns a higher value when x is an infrequent event than when x is frequent. It can thus be seen as measuring the "degree of surprise" for a column value. It measures the number of bits of information that is imparted by the event x occurring. The entropy of a column $c_i$ in the dataset is then defined to be:

$$\text{Entropy}(c_i) = -\text{sum}(x \log_2(x))$$

where x is the probability of each of the possible values that the column's entries take.

1.7 Data Structures

Bitset: a bitset is an array of bits (0s and 1s). Bitsets can be efficiently manipulated by a set of logical operations. They are used in the preferred embodiments described herein as a way of representing the occurrences of a discrete value in a column in the data set. Each discrete value found in a particular column is represented by one bitset, called an item bitset. The bitset will have a 1 or a 0 in each location in its array depending on whether the item's value appears or does not appear, respectively, at that location in the item's column.

Map: a map is a data structure that maintains associations between instances of objects, such as item and bitset. Each entry in an "item-to-bitset" map would link a particular item to a particular bitset. Given a particular item, it is possible to look up and retrieve its associated bitset from the map.

2. Example Method

There will now be described an example of an embodiment of the present invention that is used to identify or detect inconsistent items within a data set. The present example can be regarded as proceeding in two main stages:

1. pre-process the data set to:
   (a) assess column cardinalities,
   (b) build item bitsets, and
   (c) select columns for analysis; and
2. analyse the item bitsets to:
   (a) search for unusual combinations, and
   (b) sort, and return the most unusual combinations

2.1. Pre-Processing the Data Set

Prior to loading the data, maps corresponding to the columns of the data (one map per column) are created so that a link can be retained between unique values in each column (i.e. items) and the corresponding item bitsets.

A maximum cardinality threshold is selected in advance, in this example this being set manually by a user. Since values from high cardinality columns are less likely on average to be constituents of an infrequent itemset as mentioned above, maps corresponding to columns that exceed a user-set cardinality threshold are removed while data is read in. This is typically the case for columns containing continuous values.

The pre-processing stage of the present example then proceeds as follows:

1. Data is read in from the data set sequentially one row at a time:
   (a) each row is traversed item by item;
   (b) if an item is encountered that has not been met before:
      (i) the cardinality count for the column is incremented. If it has exceeded the maximum cardinality threshold, the map and the bitsets for corresponding column are removed from memory; otherwise:
      (ii) a mapping between the new item and a new bitset is created in the column's map;
   (c) the item's bitset is updated by setting (to
      1) the bit with the same index as the current row number;
   (d) repeat for each item in the current row.
2. These operations are performed for every row until the entire data set has been processed.
3. Summarise the set of unique items found in each column into a table of items for each column. These are the set of items that may be looked up in each column's map. Throw away any column that has exceeded the cardinality threshold.

Figure 3:
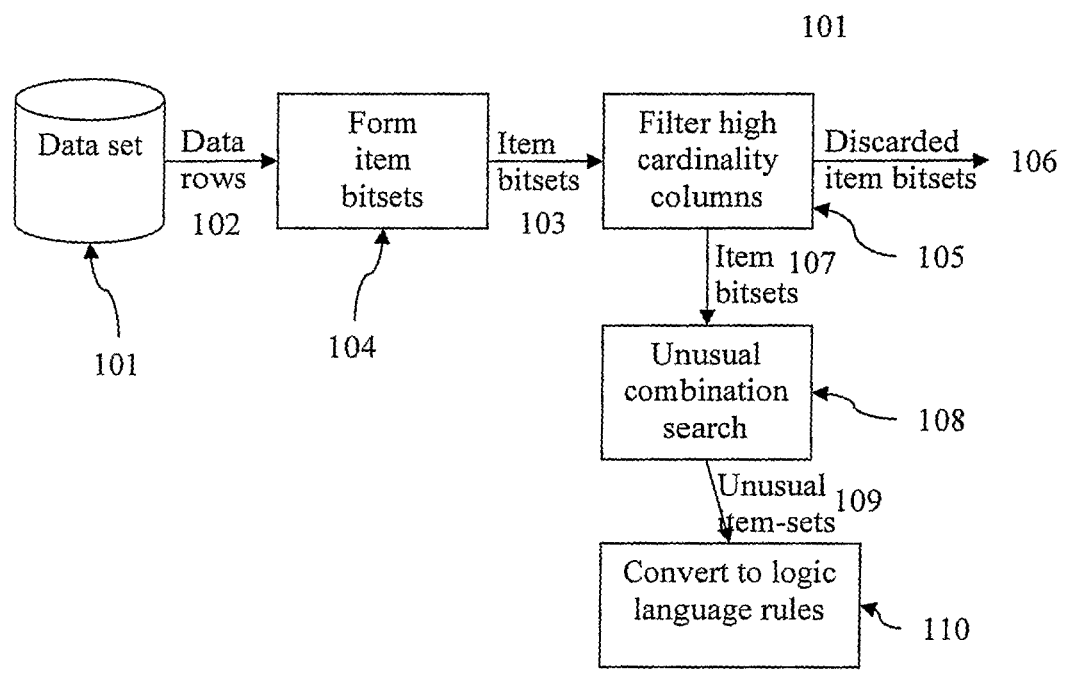
FIG. 3 shows schematically an overview of an example of a method for finding unusual combinations.

The above steps are shown schematically in FIG. 3, which shows a data set 101 from which data rows 102 are read. Item bitsets 103 are formed 104 from the data rows 102. High cardinality columns are filtered 105 and corresponding item bitsets discarded 106 as described above. The other item bitsets are retained 107 for analysis as discussed further below.

2.2. Search

The search 108 employs a breadth-first search method searching the search space of possible item combinations.

The search 108 uses the entries in the table of unique items per column generated in the pre-processing stage. A new "virtual" item is added to the start of each list of items for each column. This virtual item corresponds to "no item", the absence of an item for that column. A respective pointer for each column's list of items indicates which item is currently being considered for that column.

The search is undertaken using a pointer over the columns themselves. The pointer indicates which column's item selection is currently being modified. The search method tries all the combinations of items, choosing one from each column's item list (including the "no item" virtual items). The search is structured in such a way as to allow optimal pruning of the search space, i.e. the (early) removal of itemsets from being searched, which speeds the search process.

The search starts with all the columns' item pointers pointing to a "start" position before the "no item" item in each column's item list and with the column pointer pointing at the second column from the right.

Figure 4:
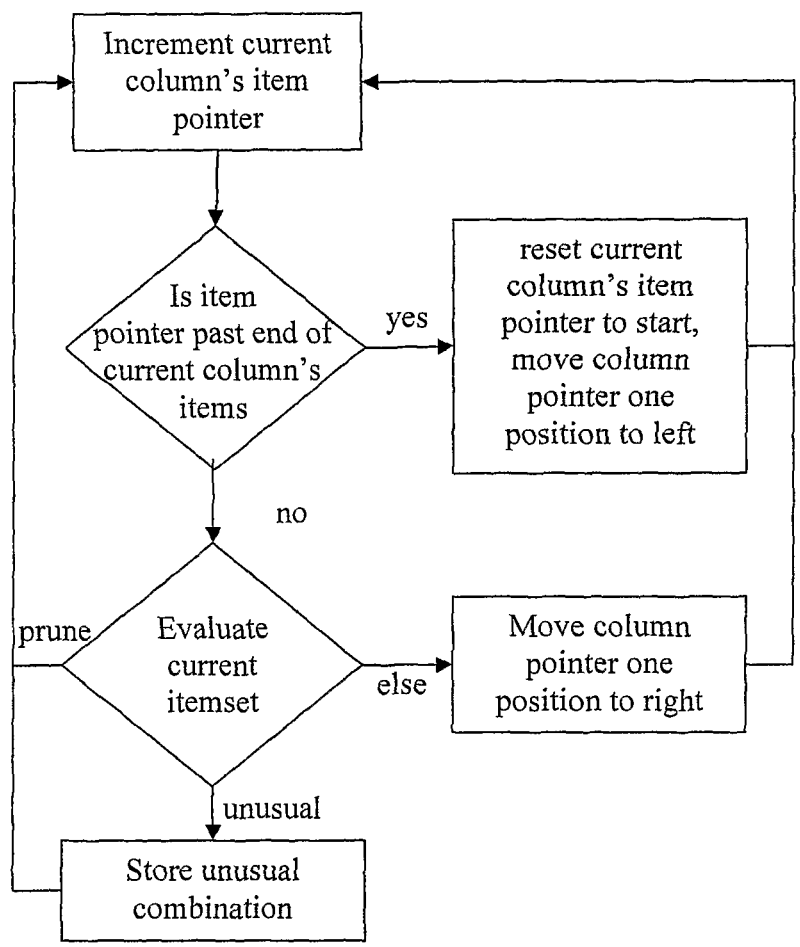
FIG. 4 shows schematically an overview of an example of a search method used the method of FIG. 3.

Referring to FIG. 4, the search proceeds as follows:
1. move forward one place the item pointer of the column indicated by the column pointer;
2. if the current column's item pointer is past the end of the item list:
   (a) reset the item pointer back up to before the start "no item",
   (b) move the column pointer one position to the left,
   (c) go to 1.
3. else, evaluate the itemset specified by all the column item pointers (see next section). Depending on the result:
   (a) if the itemset is evaluated as an unusual combination, store it, then go to 1.
   (b) if the itemset is evaluated as suitable to be pruned, then go straight back to 1,
   (c) else move the column pointer one place to the right, and then go to 1.

2.3. Evaluating Itemsets

At each stage of the search, the current set of selected items in each column item list is combined to form an itemset. The associated bitset for each item in each column is combined using a logical AND to form a coverage bitset for the itemset as a whole. This coverage bitset is then used to compute the coverage of the combined itemset.

The combined itemset is evaluated to determine one of three outcomes:
1. the itemset is an unusual combination 109, and is output,
2. the itemset and all its derivatives cannot be unusual, and should therefore be pruned from the search, or
3. the itemset could potentially have unusual derivations, so the search should be continued.

Three examples methods of this evaluation procedure will now be discussed. These consist of three separate formulae, called evaluation metrics, for providing a value measure indicating how unusual is the itemset being evaluated.

A threshold θ determines whether each itemset is so unusual as to be recorded. In one preferred embodiment of the present example, this threshold is manually provided. In an alternative embodiment, the threshold is computed automatically. An example of how to compute the threshold automatically is given below.

In each case, given an evaluation formula, further analysis will determine whether an itemset should be pruned.

In the following formulae, X denotes an itemset; $x_1$, $x_2$, $x_3$, . . . denote X's individual constituent items, and $x_i$ denotes them all; coverage(X) denotes an itemset's coverage in the dataset, and D is the size (i.e. number of rows) of the data set itself.

Given a threshold θ, in each of the cases below, an itemset being tested will be evaluated as unusual if the value of the evaluation metric exceeds θ.

1. Relative Frequency:

$$\text{RelativeFrequency}(X) = \min(\text{cov}(x_i))/\text{cov}(X)$$

This measures the infrequency of an itemset's coverage relative to the smallest coverage of its constituent items. Any candidate itemsets that are infrequent when compared to their individual constituents will be identified by this formula.

It should be noted that this infrequency value changes greatly from dataset to dataset, which makes it difficult to set a default threshold value. The following alternative methods, in which information measures are used, give a more stable estimate.

2. Excess Bits:

$$\text{ExcessBits}(X) = -\log_2(\text{cov}(X)/D)/\text{sum}(-\log_2(\text{cov}(x_i))/D)$$

This formula measures the number of excess bits in an itemset as a ratio. The excess bits measure can be interpreted as "the amount of extra information contained in an itemset compared to the sum of the information of its constituents". The advantage of this approach compared to relative frequency is that an infrequent itemset will generate an excess bits value that is significantly higher than that of a more frequent combination, which makes the discrimination of unusual items clearer.

This method does not, however, take the underlying properties of the columns that the items are taken from into consideration. The final formula addresses this problem.

3. Scaled Excess Bits:

$$\text{ExcessBitsScaled}(X) = (-\log_2(\text{cov}(X)/D) - \text{sum}(-\log_2(\text{cov}(x_i))/D))/\text{estimate(Average Column Entropy in itemset)}$$

where:
estimate (Average Column Entropy in itemset)=(max(Entropy($c_i$))+sum(Entropy($c_i$))/2

This formula scales the excess bits by an approximated average information content of the columns from which the items were taken. It has the appealing property that it takes the underlying information content of the columns from which the items are taken into consideration when measuring the degree of infrequency, which ensures that variations due to patterns in column entropy do not lead to itemsets being incorrectly identified as unusual.

Using the census data set example given above, FIG. 5 shows how a particular combination (here "female" and "husband") has been identified as an unusual combination. FIG. 6 shows an item combination search table, illustrating the column pointer and each column's item-pointer as discussed above for the census data set example.

2.4. Pruning

At each stage of the search for unusual itemsets, a determination can be made as to whether it is worthwhile continuing the search from that point or whether instead the search should backtrack and try a different potential combined set of items. This strategy can greatly reduce the amount of work required to identify unusual itemsets, thus improving the overall performance of the present method.

A number of possibilities are available, including:

Empty Itemset:

If the coverage of an itemset is at any time evaluated to be 0 then there is no row of data in the dataset that matches the pattern of items. This means that the itemset, and any derivative of it, cannot appear in the data and should therefore be pruned.

Dependent on a Predefined Threshold:

For each of the evaluation metrics described in the previous section, and given a predefined threshold, it may be possible to determine a level of itemset coverage below which it is not worth continuing the search and at which the itemset search should therefore be pruned. Examples of an implementation of this for each of the evaluation metrics discussed above are given below.

1. Relative Frequency:

For the relative frequency evaluation metric, once the following holds:

$$\min(\text{coverage}(x_i)) < \theta$$

it is then impossible for the given itemset, or any derivation of it, to be evaluated as unusual and it should therefore be pruned.

2. Excess Bits:

For the excess bits evaluation metric, once the following holds:

$$\text{sum}(-\log_2(\text{cov}(x_1))/D) > -\log_2(1/D)/\theta$$

it is then impossible for the given itemset, or any derivation of it, to be evaluated as unusual and it should therefore be pruned.

3. Excess Bits Scaled

For the excess bits-scaled metric, once the following holds:

$$\text{sum}(-\log_2(\text{cov}(x_1))/D) > -\log_2(1/D) - \theta.\text{estimate(max column entropy in dataset)}$$

where:
estimate (max column entropy in dataset)=(max(Entropy($c_i$))+sum(Entropy($c_i$))/2 over all columns $c_i$ it is then impossible for the given itemset, or any derivation of it, to be evaluated as unusual and it should therefore be pruned.

2.5 Automatic Identification of the Unusual-Value Threshold

In the above described embodiment, the method determines on-the-fly whether each itemset being evaluated exceeds a threshold that is manually set. Unfortunately this requires human input in the form of a manually input value for the threshold.

A preferred embodiment includes a process by which the threshold is identified or set automatically during the search. An example of how to achieve this is as follows:

The standard search is run, as described above. During this search, only the "empty itemset" pruning mechanism is used; the other, threshold-dependent pruning methods are not used. The threshold itself is ignored. All itemsets generated during the search process are stored in a "heap" data structure of a restricted size H so that the H itemsets with the greatest scores according to the evaluation metric are preserved.

Once the space has been searched completely, the threshold is then computed based on the highest score S achieved by all the itemsets evaluated in the search. In one example, the threshold can be set in one of three ways, depending on the preference of the user and whether the user wishes to identify significantly unusual, unusual, or slightly unusual itemsets:

any itemset with score greater than S/2 is identified as significantly unusual;

otherwise, any itemset with score greater than S/3 is identified as unusual;

otherwise, any itemset with score greater than S/4 is identified as slightly unusual.

It will be understood that the values given here for dividing the highest score S are examples only and that other values, which rise relative to each other, may be used.

2.6 Conversion of Itemsets to Logic Language Rules

An itemset is a collection of items, which in turn consist of a column coupled with a specific value for that column. This object can be simply transformed 110 into a logic language rule that describes the unusual combination and can be used to identify those rows in the data that are unusual.

Suppose there is an itemset I={($c_1$, $v_1$), ($c_2$, $v_2$), . . . ($c_n$, $v_n$)}, where the $c_i$ denote columns, and the $v_i$ denote values. In one example, this is transformed into the logic language rule:

unusual (Row):—
value (Row, $c_1$, $v_1$)
value (Row, $c_2$, $v_2$)
. . . ,
value (Row, $c_n$, $v_n$).

This rule can be interpreted, and indeed can be automatically translated in the obvious manner, into the following English statement:

a row denoted by Row is unusual if
the value in column $c_1$ of Row is $v_1$, and
the value in column $c_2$ of Row is $v_2$, and
. . . ,
the value in column $c_n$ of Row is $v_n$.

The rule can be output to the user of the system in this English statement form to aid the understanding of the unusual combination of values found by the method.

The statement can also be output in the logic language rule shown above into a file on a computer storage medium for later retrieval into a logic language execution system such as Prolog. The logic language execution system can then execute the rule against a data set in order to identify those rows in the data that exhibit the unusual combination of values described by the rule.

The data that may be handled by embodiments of the present invention may in general be any type of data. Nevertheless, the preferred embodiments of the present invention have particular application with data that conventionally has been sampled, owing for example to the volume of data which historically has made it infeasible to manually analyse all of the data. The data may be for example financial accounting data provided from an accounts software application used by a user.

In short, this method and apparatus automatically constructs rules that identify unusual transactions in the data. Any rules that are identified by the method are used to tag unusual transactions. The degree to which each rule is identified as unusual is recorded with the tagging. The results are displayed on a graph via the user's browser 12, indicating the number of unusual transactions identified for each rule. A table describes the rules that have been found and shows the transaction count and total value for each of them. Clicking on a rule will display the individual transactions covered by that rule.

Identification of Duplicate Transactions

A duplicate transaction entered into an accounting application is an erroneously entered transaction that inadvertently replicates the contents of another transaction. For example, a supplier payment invoice may be entered twice into the accounting application. If this is not identified, this error may result in the supplier being paid twice for the same service, a potentially costly or embarrassing mistake.

A preferred embodiment of the core validation element will identify duplicate transactions in the data. Typically duplicate transactions are found among the Sales and Purchase invoices, and an embodiment of the core validation element focuses on these transactions.

The following is one method for identifying duplicate transactions, which follows a similar approach to the method of identifying contra and reversal transactions described earlier.

Step 1: Sort the Data

The date is first reordered to place transactions of the same type (e.g. purchase invoices, sales invoices, etc.) close together; within these, transactions of similar value are placed close together; finally, those transactions are placed in order of date.

Step 2: Conduct a Windowed Pass Over the Data

The new ordering places the transactions in an order suitable for analysis using a windowed neighbourhood approach. Each transaction is checked against the other transactions within its neighbourhood to determine if they might be duplicates of each other. A preferred method of controlling the size of the window neighbourhood is to ensure that all the transactions within a window fall within a pre-defined time period of each other.

Step 3: Identify Duplicate Pairs

In order to determine if two transactions are duplicates of each other, the method checks that:
the transactions are or the same type,
they are for approximately the same amount, and
the descriptive text within each of the two transactions is suitably similar.

If all of these criteria are satisfied then the pair is marked up as a candidate duplicate pair.

Step 4: Filter Candidate Duplicate Pairs

The candidate transaction pairs are filtered to identify the true duplicate transactions among them. An embodiment of the present invention may use the following mechanism to filter the candidates. The candidate pairs are analysed to determine their transitive closure. The transitive closure is formed by applying the following rule to the set of candidate pairs: if <A,B> is a candidate pair, and <B,C> is a candidate pair, then the transitive closure must also include <A,C> as a candidate pair. This rule is repeated until it cannot be applied further. After forming the transitive closure, if any transaction is included in more than one candidate pair, then it, and all the candidate pairs that involve it, are removed from the set of candidate duplicate pairs. The set of candidate duplicate pairs that remain after this step is complete is the filtered set of duplicate transactions.

Embodiments of the present invention can use a variety of metrics to determine the similarity of transaction descriptions. These include, but are not limited to:
Jaro-Winkler similarity;
2-QGram similarity;
a metric which forces any numbers that appear in the descriptive text to be identical.

Incomplete Values

The transaction description and reference fields within accounting data are very useful as they help provide background information about each of the transactions. The fields are generally free-form text, and must be completed by the user at the time of entering the transaction into the accounting package system. However, quite often the user will fail to do this, reducing the usefulness of this field. The preferred analytical review module 16 analyses how incomplete these reference fields are to provide an indication of the significance of this problem. A graph indicates what percentage of the transactions in the uploaded data file has incomplete (empty) transaction description or reference fields.

Benford Analysis

Numerical data generated through natural behaviour exhibits a particular distribution in the spread of the leading digits of the numbers, known as the Benford distribution. The analytical review module 16 can check the leading digits of the values in the transaction data file against the expected distribution, and flag any deviation when and if it is found. If, and only if, the distribution of leading digits appears unusual, then the user is warned that the data has potentially been manipulated.

Upload Comparison

The transaction file uploaded by the user will contain the complete history of the transactions found in the accounts being analysed. This means that each transaction file uploaded will be completely contained within each subsequently uploaded data file. This overlap is used by the analytical review module 16 to check for any manipulations of historical transactional data, which can be done by comparing transactions in uploaded data files with the same transactions in earlier uploaded files.

If any manipulation or alteration is found, then the user is alerted that historical transactions appear to have been manipulated.

Materiality

Accountants traditionally limit their investigations to transactions above a certain limit of materiality. Only "material" transactions of a size above this threshold are deemed significant relative to the scope and scale of the organisation being audited. This step is fundamentally a sampling mechanism, as it limits the investigation undertaken by the auditor to only those transactions "worth worrying about". The preferred embodiment described herein checks every single transaction, but can optionally hide any issues it finds that are of a value less than the limit of materiality. Certain accounts are by their nature always material and therefore any validation failures in these accounts should always be displayed regardless of their size. The user is able to switch off materiality filtering in order to display all transactions.

The materiality value is derived automatically from the data. Accountants use several mechanisms to compute materiality values and so alternative values, computed in alternative manners, are presented to the user to allow him to choose the value he wishes to use.

Validation Summary

The validation issues found by the validation process are made available to the user via the user's web browser 12 in a graphical interface. This presents the count and sum of the errors found by account, laid out in the structure of a profit and loss statement and a balance sheet.

Data Analysis

Following operation of the investigative data validation component of the validation and analysis engine 10, the analytical review module 16 provides the user with insight into the user's data through the extraction, computation and display of useful information from the uploaded data files. The result of this analysis is displayed through an interface via the user's web browser 12, this interface being arranged to allow the user to explore the information interactively.

Analytical Review: Variation Analysis

Variation analysis can be used to show changes in for example the profit and loss statement of a company from one period to the next. The analytical review module 16 extracts this information from the uploaded accounts and causes display of variations to the user. By using the mapped Accounting Ontology 9 as a framework, the analytical review module 16 is able to process the transactions in the uploaded file to compute full profit and loss and balance sheet statements from the data. Furthermore, it can compute aggregated values for several alternative periods, including monthly, quarterly, and annually. The display of the results compares the most recent period with a previous period, and displays the variation in absolute and percentage terms of the value in the current versus the previous period in the statement table. The user is again provided with the functionality to be able to drill down to view the details of by expanding visible entries in the table. The user can select which period is used as a comparative period. Any values in the table that have been computed from transactions that have been flagged as contributing to an issue found by the validation process discussed above are highlighted to the user with a warning that they could be erroneous.

Analytical Review: Ratio Analysis

Ratio analysis shows fundamental metrics of a company's performance in terms of financial values that can be computed about that company's profit and loss and balance sheet statements. The analytical review module 16 extracts this information from the uploaded accounts and causes display of the ratios to the user. Comparative ratios from the previous year are also be computed and displayed.

The user is able to modify the ratios that are computed and displayed. Any ratios that have been computed from transactions that have been flagged as contributing to an issue found by the validation process are highlighted to the user with a warning that they could be erroneous.

Search: Basic

Accounting packages often do not provide an adequate means of searching through the transactions for entries made in the free-form text fields in the data. The preferred validation and analysis engine 10 provides a facility to allow users to search through the description and reference fields in the latest uploaded data set. Any transactions that match the search term are displayed in the results.

Search: Advanced

Further to merely searching through the description and reference free-form text fields, the preferred validation and analysis engine 10 provides users with the ability to create and run accounting rules on the fly. This permits users to create and tune accounting rules interactively, using the rule grammar and editor described above.

The validation and analysis engine 10 then dynamically executes the rule created by the user on the underlying data. The user is able to select whether the results returned are the transactions that match the rule specification or are the transactions that do not match the rule specification (i.e. the complement result set).

User Accounts

Fundamental to user interaction with the back end server 2 is the concept of "user accounts". Each user is provided with access to that user's own personal area on the site with a password required to access it.

Profiles

Each user area can create a number of distinct profiles to separate the analysis work into conceptually self-contained units, there typically being one profile per set of financial accounts. Analysis projects may only be run inside a profile. Each profile contains at least the following properties:

name
description
accounting year end
accounting currency
ownership record, current and historical
accounting ontology
OCOA-map
set of rules
enabled rule configuration
tracked history of uploads and upload comments
results of validation and discovery The validation and analysis engine 10 provides an interface through which the owner of a profile may modify all of its properties. Each profile has a single owner, being a specific user area. The owner of a profile can reassign ownership of a profile to another user area.

Profile Sharing

The system provides the functionality to allow the owner of a profile to share the results of analysis to colleagues and team members. This allows the user to work collaboratively on the same profile. The owner of a profile can assign another user with whom to share that profile. The other user will then be able to view, resolve, and add tracking comments on issues in that profile.

Workflow

The preferred embodiment provides an issue-tracking or workflow function 17. The details of this function are described in the following sections.

Resolution Tracking

The most basic form of workflow tracking provides the ability to "tick off" issues that are found in the validation step, marking them as "resolved". The workflow function 17 tracks which issues have been resolved within a profile. In this way, the next time a data file is uploaded to that profile, any issues that have been resolved are by default not displayed. The user is able to choose whether resolved issues are displayed. In an embodiment, the user is able to resolve issues step-by-step at the individual transaction level.

Comment Tracking

A more sophisticated element of the workflow function 17 provides the user with the ability to add a persistent sequence of comments to each issue. Each comment is labelled with the username of the person making the comment and the date and time. Resolution ticking automatically adds a resolution comment to the sequence. In an embodiment, the user is able to add comments at the individual transaction level.

Teamwork

Large scale audits are usually undertaken in collaboration by a team of individuals. The preferred embodiment provides a teamwork module 18 that provides the ability to collaborate in the validation and discovery analysis in a single profile as part of its functionality. The ability to share profiles has already been described above. It is assumed here that multiple users are sharing and can view and add workflow tracking to a single profile.

Post-Analysis Issue Assignment

The simple form of issue assignment is the ability to assign issues when found to team members. Once analysis has been run, the teamwork module 18 allows users to assign "ownership" of an issue to an individual within the team. The owner of the profile is able to assign and reassign issues at any time. The assigned owner of an issue is also able to reassign issues at any time to another team member. This assignment is tracked in the workflow comments.

Pre-Analysis Issue Assignment

The preferred teamwork module 18 also provides a more sophisticated, fully automated form of team assignment based on settings configured in advance of performing the analysis. The owner of a profile is able to configure the rules in such a way so that when analysis is run, issues are automatically appropriately assigned to separate individual members of the team. For example, individual members of the team can be pre-assigned to certain nominal accounts, groups of nominal accounts, or accounting categories. Alternatively, team members can be pre-assigned to handle all issues created by particular accounting and deviation rules.

Reporting

The preferred embodiment provides the ability to download a report of the results of the analysis of data from the server 2 to the client computer 3. This can be provided in a number of different formats, including, but not limited to, Microsoft Excel format and Adobe PDF format.

Industry- and Country-Specific Settings

The rules that are relevant to a particular set of accounts vary depending on which corporate sector those accounts relate to, and from which country the accounts originate. The preferred embodiment therefore allows the user to specify the industrial sector and country during the profile creation phase, and tailors the default profiles settings accordingly.

Preconfigured Accounting Ontology

The default accounting ontology is automatically configured to comply with the sector and locale. The accounting ontology used by default is the most appropriate given the selection of industrial sector and locale made by the user. Likewise, the chart of accounts and the accounting-ontology to chart-of-accounts map are also configured to be the most suitable given the selection of industrial sector and locale made by the user.

Preconfigured Rule Enabling

The rules that are enabled by default are the most appropriate given the selection of industrial sector and locale made by the user.

Ratio Analysis Baseline Average Comparisons

The ratio analysis given by the data analysis engine 10 can compare the ratios found for the uploaded accounts to standard ratios that would be expected for the industrial sector and locale specified by the user for that profile.

Rule-Sharing Community

The preferred embodiment provides an interface that allows users to share, collaborate and exchange rules that they have created for the validation of their accounting data with other users of the system. Through online collaboration in this manner, the "body of knowledge" in the form of user-designed and created rules will, over time, increase the power and utility of the system as a whole.

Target Applications

The preferred embodiment is able to function with data uploaded from a variety of different accounting applications. The underlying architecture uses an accounting application abstraction layer 7 to interface with each accounting application. The underlying server systems are then constructed in a generic manner, and interface with the abstract accounting ontology 9.

A list of accounting applications with which the system can interface includes, but is not limited to: Sage Line 50, 100, 500, MMS, Intuit Quickbooks, MYOB, Microsoft Dynamics GP, SAP financials, and Oracle financials.

It will be understood that the term "computer" as used herein is to be construed broadly. The term "a computer" may include several distributed discrete computing devices or components thereof. Although the embodiments of the present invention described with reference to the drawings comprise computer processes performed in computer apparatus and computer apparatus itself, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the processes according to the invention. The carrier be any entity or device capable of carrying the program. For example, the carrier may comprise a storage medium, such as a ROM, for example a CD ROM or a semiconductor ROM, or a magnetic recording medium, for example a floppy disk or hard disk. Further, the carrier may be a transmissible carrier such as an electrical or optical signal which may be conveyed via electrical or optical cable or by radio or other means. When the program is embodied in a signal which may be conveyed directly by a cable or other device or means, the carrier may be constituted by such cable or other device or means. Alternatively, the carrier may be an integrated circuit in which the program is embedded, the integrated circuit being adapted for performing, or for use in the performance of, the relevant processes. Many of the processing steps may be carried out using software, dedicated hardware (such as ASICs), or a combination.

Embodiments of the present invention have been described with particular reference to the examples illustrated. However, it will be appreciated that variations and modifications may be made to the examples described within the scope of the present invention.

The invention claimed is:

1. An on-line method of analyzing financial accounting data, the method comprising:
   receiving at a server financial accounting data communicated from a computerized accounting package, the financial accounting data comprising a set of accounts comprising accounting transactions comprising values allocated to one or more in the set of accounts, the set of accounts being organized as a chart of accounts having a hierarchical tree structure wherein the structure of the tree is unknown;
   abstracting the financial accounting data to correspond to an accounting ontology that is stored at the server, the accounting ontology having a predetermined structure comprising a hierarchy of nodes in a tree structure that is independent of the structure of the financial accounting data, wherein each node represents an accounting category and wherein at least one node is mapped to plural accounts in the set of accounts;
   wherein abstracting the financial accounting data comprises an automatic process in which the nodes of the ontology are matched with the accounts in the set of accounts to determine a mapping between the financial accounting data and the accounting ontology;
   analyzing the abstracted financial accounting data at the server to identify anomalies in the data by:
      applying predetermined accounting or other validation rules to the data to determine validation failures, the rules being defined in terms of nodes of the accounting ontology so as to be independent of the structure of the financial accounting data, wherein at least one rule is defined in terms that include said at least one node that is mapped to plural accounts; and
   providing a report or a display representing the anomalies that have been identified.

2. The method according to claim 1, wherein the abstracted data and the accounting ontology are represented by tree structures having nodes and branches, the map being obtained by recursively determining an overlap of nodes in the abstracted data with nodes in the accounting ontology.

3. The method according to claim 2, wherein the overlap is measured within a predefined tolerance.

4. The method according to claim 1, comprising editing the determined mapping to amend the correspondence between the financial accounting data and the accounting ontology.

5. The method according to claim 1, wherein the analyzing is carried out on the entirety of the financial accounting data received by the server.

6. The method according to claim 4, wherein contra and reversal transactions are withdrawn from further analysis.

7. The method according to claim 1, wherein the rules may be edited by a user.

8. The method according to claim 1, wherein at least some of the rules check the data for variation beyond a threshold compared to a corresponding variation of the data at a previous time instance.

9. The method according to claim 1, comprising determining a distribution of at least some of the data over a period of time, wherein the analyzing comprises identifying data that exists beyond a threshold outside said distribution.

10. The method according to claim 1, wherein the report that is provided includes an indication of a number of anomalies that have been identified and an ability to display details of individual transactions in the analyzed data that have contributed to said anomalies.

11. The method according to claim 1, wherein the analyzing comprises identifying contra and reversal transactions in the data.

12. The method according to claim 1, wherein at least some of the rules check the data for violation of a particular state.

13. The method according to claim 1 wherein analyzing further comprises finding transactions with unusual combinations of values in the abstracted data.

14. An apparatus for on-line analysis of financial accounting data, the apparatus comprising:
   a server constructed and arranged to receive financial accounting data from a computerized accounting package, the financial accounting data comprising a set of accounts comprising accounting transactions comprising values allocated to one or more account in the set of accounts, the set of accounts being organized as a chart of accounts having a hierarchical tree structure wherein the structure of the tree is unknown;
   wherein the server comprises an abstraction engine constructed and arranged to abstract the financial accounting data to correspond to an accounting ontology that is stored at the server, the accounting ontology having a predetermined structure comprising a hierarchy of nodes in a tree structure that is independent of the structure of the financial accounting data, each node representing an accounting category, wherein at least one node is mapped to plural accounts in the set of accounts,
   wherein abstracting the financial accounting data comprises an automatic process in which the nodes of the ontology are matched with the accounts in the set of accounts to determine a mapping between the financial accounting data and the accounting ontology;
   the server having a data analysis engine constructed and arranged to analyze the abstracted financial accounting data at the server to identify anomalies in the data by:
      applying predetermined accounting or other validation rules to the data to determine validation errors, the rules being defined in terms of nodes of the accounting ontology so as to be independent of the structure of the financial accounting data, wherein at least one rule is defined in terms that include said at least one node that is mapped into plural accounts; and
   the server being constructed and arranged to provide a report containing a representation of the anomalies that have been identified.

15. The apparatus according to claim 14, comprising a map editor arranged to permit the determined mapping to be edited to amend the correspondence between the financial accounting data and the accounting ontology.

16. The apparatus according to claim 14, wherein the data analysis engine is arranged to identify contra and reversal transactions in the data.

17. The apparatus according to claim 16, wherein the data analysis engine is arranged to withdraw contra and reversal transactions from further analysis.

18. The apparatus according to claim 14, comprising a rule editor arranged to permit the rules to be edited by a user.

19. The apparatus according to claim 14, wherein the data analysis engine is arranged such that at least some of the rules check the data for violation of a particular state.

20. The apparatus according to claim 14, wherein the data analysis engine is arranged to determine a distribution of at least some of the data over a period of time and to identify data that exists beyond a threshold outside said distribution.

21. The apparatus according to claim 14, wherein the data analysis engine is arranged to identify duplicate transactions in the data.

22. The apparatus according to claim 21, wherein the data analysis engine is arranged to identify duplicate transactions among Sales and Purchase invoices.

23. The apparatus according to claim 14, wherein the server is arranged such that a display that is provided includes an indication of a number of anomalies that have been identified and the ability to display details of the individual transactions in the analyzed data that have contributed to said anomalies.

24. The apparatus according to claim 14, wherein the data analysis engine is arranged such that at least some of the rules check the data for variation beyond a threshold compared to a corresponding variation of the data at a previous time instance.

25. The apparatus according to claim 14 wherein the data analysis engine analyzes the data at the server to identify anomalies in the data by finding transactions with unusual combinations of values in the abstracted data.

26. A non-transitory computer readable carrier containing program instructions that, when executed, cause a processor to:
   receive financial accounting data communicated from a computerized accounting package, the financial accounting data comprising a set of accounts comprising accounting transactions comprising values allocated to one or more in the set of accounts, the set of accounts being organized as a chart of accounts having a hierarchical tree structure wherein the structure of the tree is unknown;
   abstract the financial accounting data to correspond to an accounting ontology that is stored at a server, the accounting ontology having a predetermined structure comprising a hierarchy of nodes in a tree structure that is independent of the structure of the financial accounting data, wherein each node represents an accounting category and wherein at least one lode is mapped to plural accounts in the set of accounts;
   wherein abstracting the financial accounting data comprises an automatic process in which the nodes of the ontology are matched with the accounts in the set of accounts to determine a mapping between the financial accounting data and the accounting ontology;
   analyze the abstracted financial accounting data to identify anomalies in the data, wherein the processor further:
      applies predetermined accounting or other validation rules to the data to determine validation failures, the rules being defined in terms of nodes of the accounting ontology so as to be independent f the structure f the financial accounting data, wherein at least one rule is defined in terms that include said at least one node that is mapped to plural accounts; and
   provide a report or a display representing the anomalies that have been identified.

* * * * *